(12) United States Patent
Shakenis et al.

(10) Patent No.: US 6,883,315 B2
(45) Date of Patent: Apr. 26, 2005

(54) INLET MANIFOLD TEMPERATURE CONTROL SYSTEM FOR AN INTERNAL COMBUSTION ENGINE

(75) Inventors: Stanley D. Shakenis, Boise, ID (US); Philip T. Leonard, Nampa, ID (US); Randall D. Payne, Emmett, ID (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 101 days.

(21) Appl. No.: 10/411,685

(22) Filed: Apr. 11, 2003

(65) Prior Publication Data

US 2004/0200220 A1 Oct. 14, 2004

(51) Int. Cl.$^7$ .......................... F02B 29/04; F02B 33/00
(52) U.S. Cl. ...................................... 60/599; 123/563
(58) Field of Search .......................... 60/599; 123/563, 123/542

(56) References Cited

U.S. PATENT DOCUMENTS

| | | | | |
|---|---|---|---|---|
| 4,207,848 A | * | 6/1980 | Dinger et al. | ............... 60/599 |
| 4,632,178 A | * | 12/1986 | Hirano | ................. 123/563 |
| 6,561,169 B2 | * | 5/2003 | Sealy et al. | ............... 123/563 |

FOREIGN PATENT DOCUMENTS

| JP | 55096320 A | * | 7/1980 | ................. 60/599 |
|---|---|---|---|---|
| JP | 60212616 A | * | 10/1985 | ................. 60/599 |
| JP | 61065016 A | * | 4/1986 | ........... F02B/29/04 |
| JP | 61065017 A | * | 4/1986 | ........... F02B/29/04 |
| JP | 61072830 A | * | 4/1986 | ................. 123/563 |
| JP | 62276218 A | * | 12/1987 | ................. 123/563 |
| JP | 03115733 | * | 5/1991 | ................. 123/563 |

* cited by examiner

Primary Examiner—Thomas Denion
Assistant Examiner—Thai-Ba Trieu
(74) Attorney, Agent, or Firm—James Ray & Associates

(57) ABSTRACT

The turbocharged exit air from a turbocharger flows through an intercooler, and then into an air intake manifold of a diesel engine. The intercooler exchanges heat with a liquid coolant in the intercooler when the coolant is cooler than the charge air, and substantially does not exchange heat with the liquid coolant in the intercooler when the coolant is warmer than the charge air. A controller located on the coolant tubing leading into the intercooler compares the temperature of the charge air to the temperature of the coolant, and at least partially stops the coolant from circulating by at least partially closing a valve in the coolant tubing when the charge air is cooler than the coolant.

18 Claims, 1 Drawing Sheet

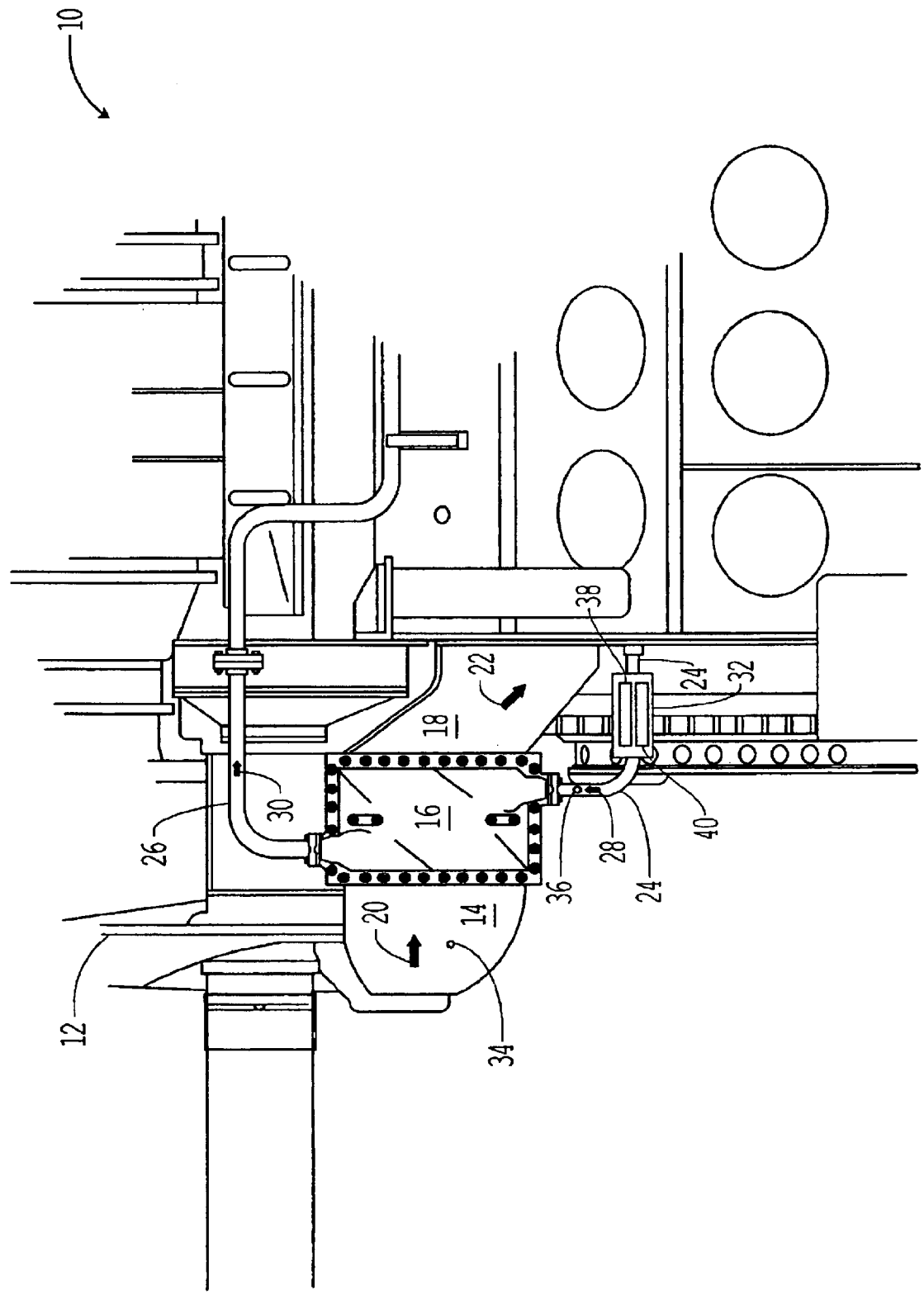

INLET MANIFOLD TEMPERATURE CONTROL SYSTEM FOR AN INTERNAL COMBUSTION ENGINE

BACKGROUND OF THE INVENTION

1. Field of the Invention

This invention relates to cooling the air going into an engine's inlet manifold and, more specifically, to cooling the air going into an inlet manifold of an internal combustion engine with a turbocharger.

2. Description of Related Art

A turbocharged engine utilizes exhaust energy to increase the engine's horsepower and efficiency. Because of the increased energy in the compressed air, or charge air, leaving the turbocharger, the charge air is at an elevated temperature. A heat exchanger such as an intercooler or after-cooler is typically used to remove heat from the compressed air before it enters the engine's intake manifold. The intercooler/after-cooler is designed to transfer heat from the charge air to a lower temperature medium such as a cooling fluid. Thus the cooled charge air temperature is dependent upon the cooling fluid temperature. Typically the engine jacket cooling fluid or a separate cooling fluid circuit is utilized as the medium to remove the charge air heat.

Unless an air to air heat exchanger is used, the temperature of a coolant is limited and is dependent upon the engine operating temperature, the engine size, the coolant thermal capacity, or the effectiveness of the cooling system. The liquid coolant temperature in most cases will be greater than the temperature of the ambient outside air. It has been proven that lower brake specific fuel consumption and lower NOx emissions can be achieved if the charge air exiting the heat exchanger and entering the combustion chamber can be maintained at the lowest possible temperature.

Therefore, it can be appreciated that an apparatus and method for reducing the temperature of the charge air is desirable.

BRIEF SUMMARY OF THE INVENTION

In one aspect the present invention generally provides a method for regulating the cooling of a turbocharged engine's intake air where the engine has a heat exchanger for transferring heat between a coolant and the intake air. The cooling is regulated by substantially not allowing the coolant to transfer heat to the engine intake air when the coolant is hotter than the charge air. Yet another aspect of this invention is to provide a turbocharged engine intake air temperature regulator having a heat exchange chamber for transferring heat between the charge air from the turbocharger and a coolant. The regulator includes a first temperature sensor for sensing the temperature of the charge air, a second temperature sensor for sensing the temperature of the coolant and a controller that at least partially closes a valve in the coolant tubing to thereby at least partially inhibit the flow of the coolant into the heat exchange chamber when the first temperature sensor senses a lower temperature than the second temperature sensor.

A still further aspect of this invention is to provide an engine intake air temperature regulator means having a heat exchange chamber means for transferring heat between the charge air from the turbocharger and a coolant. The temperature regulator also has a first temperature sensor means for sensing the temperature of the charge air, a second temperature sensor means for sensing the temperature of the coolant and a controller means that at least partially closes a valve in the coolant tubing to thereby at least partially inhibit the flow of the coolant into the heat exchange chamber means when the first temperature sensor means senses a lower temperature than the second temperature sensor means.

OBJECTS OF THE INVENTION

It is, therefore, one of the primary objects of the present invention to provide an apparatus and method for reducing the temperature of the charge air from a turbocharger before it enters an intake manifold of an engine.

Another object, of the present invention, is to provide an apparatus with relatively inexpensive hardware which is relatively easy to install to improve the efficiency of a turbocharged engine with an liquid coolant intercooler used to cool the compressed air from a turbocharger.

Yet another object, of the present invention, is to provide a method for regulating the heat exchange between the charge air from a turbocharger and a liquid coolant in an intercooler.

In addition to the above-described objects and advantages of the present invention, various other objects and advantages will become more readily apparent to those persons who are skilled in the same and related arts from the following more detailed description on the invention, particularly, when such description is taken in conjunction with the attached drawing and appended claims.

DESCRIPTION OF THE DRAWING

The sole FIGURE is a schematic diagram of a portion of a diesel engine with an intercooler and controller according to the present invention.

DETAILED DESCRIPTION OF THE PREFERRED EMBODIMENT

A typical locomotive engine operates at 11 distinct power levels, 8 tractive notches, 2 idle speeds and a dynamic brake mode. During operation, and depending on the service duty cycle, a locomotive can spend 75% of its life in the lower power notches, idle through notch 5. In these modes, the temperature of the compressed air exiting the turbocharger can be less than the temperature of the liquid cooling medium supplying the intercooler/after-cooler. As the charge air passes through the intercooler/after-cooler heat can be transferred from the liquid coolant to the charge air. This is detrimental to both emissions and fuel consumption.

Turning now to the drawing, the sole FIGURE shows a schematic diagram of a portion of a diesel engine, shown generally as 10, having an intercooler and controller according to the present invention. In the presently preferred embodiment the engine 10 is an EMD diesel engine manufactured by the Electromotive Division of General Motors Corporation. The engine 10 has a turbocharger 12, an output duct 14 from the turbocharger 12, a heat exchanger or intercooler 16 and an intake manifold 18. Arrows 20 and 22 indicate the direction of the charge air flow from the turbocharger 12 with arrow 20 showing the charge air flow upstream of the intercooler 16, and arrow 22 showing the charge air flow downstream of the intercooler 16. Also shown is a coolant supply line or tubing 24 which supplies liquid coolant to the intercooler 16, and a coolant outflowing line or tubing 26 for carrying the coolant away from the heat exchanger 16 and away from the proximity of the engine 10 to a place where the coolant is itself cooled.

Arrows 28 and 30 indicate the direction of the coolant flow with arrow 28 showing the coolant flow upstream of the intercooler 16, and arrow 30 showing the coolant flow downstream of the intercooler 16.

In the presently preferred embodiment a coolant flow controller 32 is inserted into the coolant input line 24 although it could be inserted anywhere in the charge air coolant tubing loop. Two temperature probes or sensors 34 and 36 sense the temperature in the duct 14 and the coolant input line 24, respectively, and connect with the controller 32 with wires not shown in the drawing.

In operation the invention will limit or stop the flow of the coolant supplying the intercooler/after-cooler during engine operating modes wherein the charge air temperature is less than the coolant temperature. The temperature probes 34 and 36 monitor both the compressed (turbocharged) air temperature and the liquid coolant temperature supplying the intercooler 16, respectively. The controller 32, in the presently preferred embodiment, contains programmed logic 38 which responds to the temperature inputs and actuates a valve 40 in the controller 32 which closes, opens or adjusts the coolant flow to the intercooler 16. Designing and building the controller 32 are well within the abilities of those skilled in the art. Testing has shown that this system reduces both the NOx duty cycle emission rate by as much as 7% and duty cycle fuel consumption by 0.5%.

If the coolant flowing into the intercooler 16 is completely stopped, the temperature sensor 36, located proximate the intercooler 16 but remote from where the coolant is cooled, then the temperature sensor 36 would sense the temperature of the stagnant cooling fluid which may be either warmer or cooler than the temperature sensed if the coolant was flowing, and, as a result, the charge air entering the intake manifold 18 of the engine 10 may be warmer than if the coolant was flowing through the intercooler 16. There are several solutions to this problem. One solution is to locate the coolant temperature sensor 36 proximate the coolant cooling apparatus (not shown) where the temperature would measure the temperature of the coolant in engine 10 in which the coolant for the intercooler 16 is mixed with another coolant used for other purposes, such as the coolant used for the jacket of the engine 10. A second solution is to allow a small amount of coolant to flow through the intercooler 16 at all times so that the coolant temperature sensor 36, especially when it is located proximate to the intercooler 16, measures the approximate coolant temperature which would be present if the coolant was fully flowing through the intercooler 16. This can be accomplished by allowing the valve in the controller 32 to only partially close, or by placing a small diameter tube around the valve to enable the small amount of coolant flow when the valve is closed.

Thus, there has been shown and described a method for regulating the heat exchange between the charge air from a turbocharger 12 in an intercooler 16 using a liquid coolant. More particularly, an apparatus and method has been disclosed for reducing the temperature of the charge air entering the intake manifold 18 of the engine 10. Moreover, the present invention provides an apparatus for controlling the charge air temperature from a turbocharger which requires relatively inexpensive hardware and is relatively simple to install.

Although the invention has been described in part by making detailed reference to a certain specific embodiment, such detail is intended to be, and will be understood to be, instructional rather than restrictive. It will be appreciated by those skilled in the art that many variations may be made on the structure and mode of operation without departing from the spirit and scope of the invention as disclosed in the teachings contained herein.

We claim:

1. A method for regulating the cooling of a turbocharged engine's intake air wherein said engine has a heat exchanger for transferring heat between a coolant and said turbocharged intake air from a turbocharger comprising the step of restricting but not stopping said coolant to exchange heat with a charge air from said turbocharger when said coolant is hotter than said charge air.

2. The method for regulating the cooling of a turbocharged engine's intake air, according to claim 1, including the additional step of determining if the temperature of a coolant for cooling said turbocharged engine air is greater than the temperature of said charge air.

3. The method for regulating the cooling of a turbocharged engine's intake air, according to claim 2, including the additional step of sensing the temperature of said charge air entering into said heat exchanger located in an intake air duct, and said coolant entering into said heat exchanger.

4. The method for regulating the cooling of a turbocharged engine's intake air, according to claim 3, including the additional steps of:
   a) placing a first temperature sensing device in an engine's intake air duct upstream of said heat exchanger; and
   b) placing a second temperature sensing device in a tube holding said coolant, said tube being proximate and upstream of said heat exchanger.

5. The method for regulating the cooling of a turbocharged engine's intake air, according to claim 1, wherein said step of restricting but not stopping said coolant to exchange heat with a charge air from said turbocharger when said coolant is hotter than said charge air comprises the step of partially closing a valve in a coolant supply line.

6. A turbocharged engine's intake air temperature regulator comprising:
   a) a heat exchange chamber for transferring heat between a charge air from said turbocharger and a coolant;
   b) a first temperature sensor for sensing a temperature of said charge air;
   c) a second temperature sensor for sensing a temperature of said coolant; and
   d) a controller that partially closes a valve in a coolant supply line to thereby partially inhibit the flow of said coolant into said heat exchange chamber when said first temperature sensor senses a lower temperature than said second temperature sensor.

7. The turbocharged engine's intake air temperature regulator, according to claim 6, wherein said first temperature sensor is located in said air duct upstream of said heat exchange chamber so as to sense the temperature of said charge air entering said heat exchange chamber.

8. The turbocharged engine's intake air temperature regulator, according to claim 7, wherein said second temperature sensor is located in tubing holding said coolant and proximate said heat exchanger so as to sense the temperature of said coolant entering said heat exchange chamber.

9. The turbocharged engine's intake air temperature regulator, according to claim 6, wherein said controller is located between two sections of said coolant tubing.

10. The turbocharged engine's intake air temperature regulator, according to claim 9, wherein said controller contains said valve.

11. A turbocharged engine's intake air temperature regulator means comprising:

a) a heat exchange chamber means for transferring heat between a charge air from said turbocharger and a coolant;
b) a first temperature sensor means for sensing a temperature of said charge air;
c) a second temperature sensor means for sensing a temperature of said coolant; and
d) a controller means that partially closes a valve in a coolant supply line to thereby partially inhibit the flow of said coolant into said heat exchange chamber means when said first temperature sensor means senses a lower temperature than said second temperature sensor means.

12. The turbocharged engine's intake air temperature regulator means, according to claim 11, wherein said first temperature sensor means is located in said air duct upstream of said heat exchange chamber means so as to sense the temperature of said charge air entering said heat exchange chamber means.

13. The turbocharged engine's intake air temperature regulator means, according to claim 12, wherein said second temperature sensor means is located in tubing holding said coolant and proximate said heat exchanger so as to sense the temperature of said coolant entering said heat exchange chamber means.

14. The turbocharged engine's intake air temperature regulator means, according to claim 11, wherein said controller means is located between two sections of said coolant tubing.

15. The turbocharged engine's intake air temperature regulator means, according to claim 14, wherein said controller means contains said valve.

16. A method for regulating the cooling of a turbocharged engine's intake air wherein said engine has a heat exchanger for transferring heat between a coolant and said turbocharged intake air from a turbocharger comprising the steps of:
a) determining if the temperature of a coolant for cooling said turbocharged engine air is greater than the temperature of said charge air comprising the steps of:
 i) placing a first temperature sensing device in an engine's intake air duct upstream of said heat exchanger;
 ii) placing a second temperature sensing device in a tube holding said coolant, said tube being proximate and upstream of said heat exchanger; and
 iii) sensing the temperature of said charge air entering into said heat exchanger located in said intake air duct, and said coolant entering into said heat exchanger; and
b) substantially, but not completely, stopping said coolant from exchanging heat with a charge air from said turbocharger when said coolant is hotter than said charge air.

17. A turbocharged engine's intake air temperature regulator comprising:
a) a heat exchange chamber for transferring heat between a charge air from said turbocharger and a coolant;
b) a first temperature sensor for sensing a temperature of said charge air;
c) a second temperature sensor for sensing a temperature of said coolant, said second temperature sensor located in tubing holding said coolant and proximate said heat exchanger so as to sense the temperature of said coolant entering said heat exchange chamber; and
d) a controller that at least partially closes a valve in a coolant supply line to thereby at least partially inhibit the flow of said coolant into said heat exchange chamber when said first temperature sensor senses a lower temperature than said second temperature sensor.

18. A turbocharged engine's intake air temperature regulator means comprising:
a) a heat exchange chamber means for transferring heat between a charge air from said turbocharger and a coolant;
b) a first temperature sensor means for sensing a temperature of said charge air;
c) a second temperature sensor means for sensing a temperature of said coolant located in tubing holding said coolant and proximate said heat exchanger so as to sense the temperature of said coolant entering said heat exchange chamber means; and
d) a controller means that at least partially closes a valve in a coolant supply line to thereby at least partially inhibit the flow of said coolant into said heat exchange chamber means when said temperature sensor means senses a lower temperature than said second temperature sensor means.

* * * * *